No. 767,591. PATENTED AUG. 16, 1904.
W. E. NICKERSON.
MATERIAL FEEDING APPARATUS.
APPLICATION FILED DEC. 12, 1903.
NO MODEL. 2 SHEETS—SHEET 2.
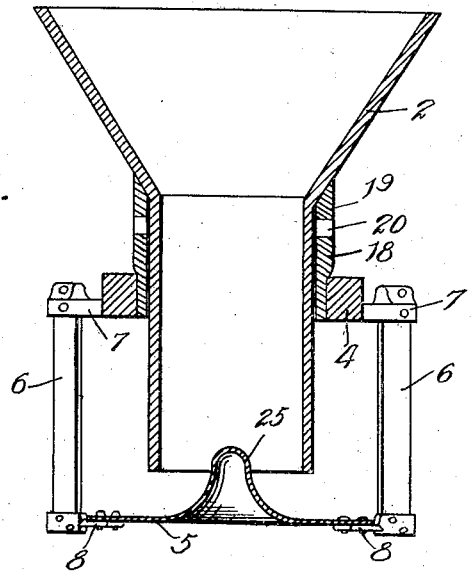
Fig. 3.
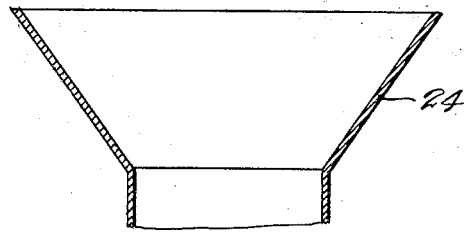
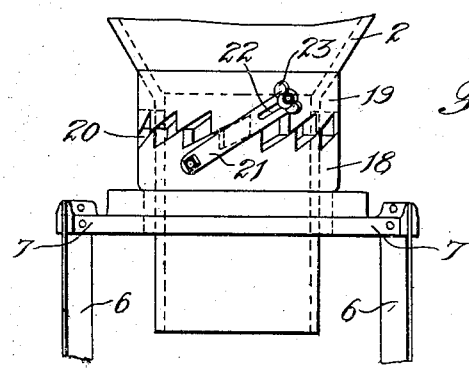
Fig. 4.
Witnesses:
Arthur T. Randall
Joseph T. Brennan
Inventor:
Wm E. Nickerson,
By E. D. Chadwick,
Attorney.

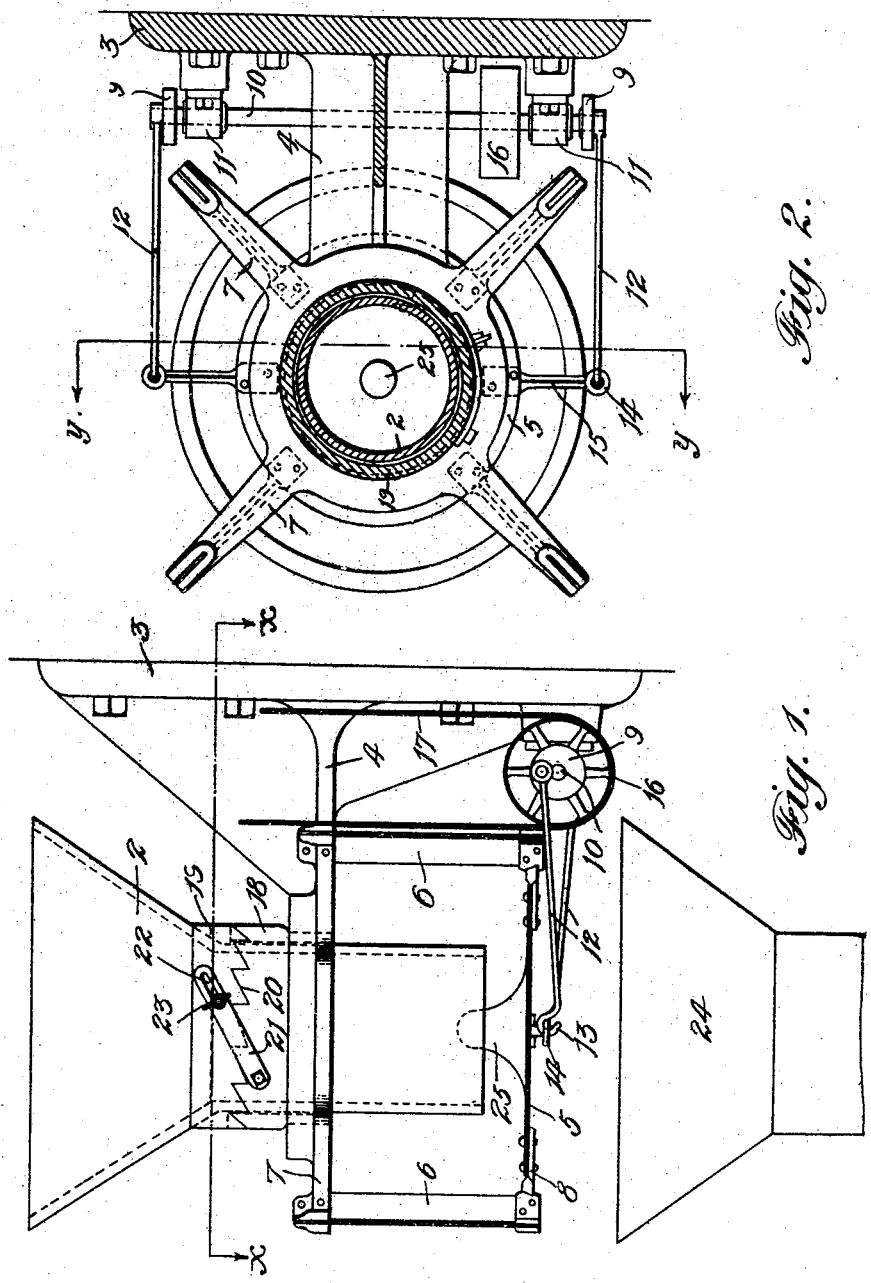

No. 767,591. Patented August 16, 1904.

UNITED STATES PATENT OFFICE.

WILLIAM E. NICKERSON, OF CAMBRIDGE, MASSACHUSETTS, ASSIGNOR TO AUTOMATIC WEIGHING MACHINE COMPANY, OF NEW YORK, N. Y., A CORPORATION OF NEW YORK.

MATERIAL-FEEDING APPARATUS.

SPECIFICATION forming part of Letters Patent No. 767,591, dated August 16, 1904.

Application filed December 12, 1903. Serial No. 184,869. (No model.)

*To all whom it may concern:*

Be it known that I, WILLIAM E. NICKERSON, a citizen of the United States, and a resident of Cambridge, in the county of Middlesex and State of Massachusetts, have invented new and useful Improvements in Material-Feeding Apparatus, of which the following is a specification.

My invention is intended to provide a device by means of which powdery or granular materials differing widely as to their physical characteristics—such as coarseness, specific gravity, and tendency to flow freely—may be fed with equal uniformity to a weighing or measuring apparatus in a manner capable of accurate control and regulation. Such a device is especially useful in connection with automatic weighing-machines, not only for the purpose of feeding material directly to the weighing bucket or receptacle in some cases, but also in many cases for the purpose of supplying the material at a uniform rate to the hopper of the weighing-machine, its flow from the hopper to the weighing bucket or receptacle being subsequently controlled by valves and the like.

In the automatic weighing of different kinds of materials it has been found necessary heretofore in many cases to provide material-feeding devices especially constructed and adapted to operate upon the particular material to be handled; and the main object of my present invention is to obviate the necessity for employing these various kinds and styles of feeding devices and to substitute therefor a single feeding device which will operate with equal success upon many different kinds of materials.

Briefly described, my feeding device comprises a plate supported in a substantially horizontal position beneath an opening in the lower end of a chute or hopper and extending laterally beyond said opening in all directions in such manner that it is capable of a limited oscillation in its own plane about a predetermined axis and means for oscillating this plate.

My improvements also include a novel suspension for said plate, together with certain other features the construction and operation of which will be hereinafter described.

In the accompanying drawings, Figure 1 is a side elevation of a preferred form of my feeding device. Fig. 2 is a sectional plan view thereof, the plane of section being indicated by the line $x\ x$ in Fig. 1. Fig. 3 is a central vertical section taken on the line $y\ y$ in Fig. 2. Fig. 4 is a side elevation similar to a portion of Fig. 1, but showing the parts in a different position.

Referring to the drawings, 2 represents a hopper having a flaring top portion and a cylindrical lower portion, said hopper being supported by means of a suitable framework, herein represented as comprising a vertical base-plate 3, adapted to be bolted to the wall of a room, for example, and provided with a laterally-extending arm 4, perforated to receive the cylindrical portion of the hopper. At a short distance beneath the open lower end of said hopper is located a plate or disk 5, which is preferably circular in outline and is of greater diameter than the opening at the lower end of the hopper. Said disk is supported in a horizontal plane, or substantially so, in such manner as to be capable of a limited oscillation about a central vertical axis, and to this end I have devised a suspension consisting of flat flexible strips 6, located, respectively, in vertical planes radiating from the desired axis of oscillation of the disk and arranged at equal distances apart around the periphery thereof. These strips are preferably four in number and made of thin sheet-steel. Each strip is rigidly secured at its upper end to a corresponding arm 7, carried by the arm 4, and at its lower end to the outer end of a pin 8, extending radially from the disk 5 and secured at its inner end to the under side thereof. These strips 6 thus support the weight of the disk 5 and of whatever material rests upon it, and by reason of their flexibility they also permit the oscillation of said disk, as above described, which oscillation results in a slight twisting of the strips 6, which is resisted by their elasticity, and thus provides a force tending to maintain the disk in its normal position. Since the plane of each strip 6 is radial with respect to the axis of oscillation of the disk, the two strips at the ends of two opposite arms 7 resist, by reason of their rigidity against endwise movement, any tendency to displacement of the disk in the diametrical direction with which their widths coincide, while the two other strips resist in a similar manner any tendency to displacement of the disk in a direction at right angles thereto, so that the four strips taken collectively serve to confine the movements of the disk to an oscillatory movement about its central vertical axis. For oscillating the disk any suitable means may be employed, such as crank-disks 9, carried at the ends of a shaft 10, which is shown as journaled in suitable bearings 11, supported on the base-plate 3, and connecting-rods 12, each mounted at one end upon the crank-pin of the corresponding disk 9 and provided at its free end with a hook 13, engaging an eye 14, formed at the end of an arm 15, which is secured to the under side of the disk 5 and projects radially therefrom. The shaft 10 is provided with driving means, such as a pulley 16, which may be driven by a belt 17 from any suitable source of power, and the arms 15 are preferably located at opposite extremities of that diameter of the disk which is parallel to the shaft 10, so that the connecting-rods 12 will be of equal length. The crank-pins on the disks 9 are oppositely located with respect to the shaft 10, so that both crank-disks operate in unison to oscillate the disk 5. It will be evident that a single crank-disk and connecting-rod or their equivalents would suffice to oscillate the disk 5; but I prefer to duplicate these parts, as shown, since the resulting strains in the strips 6 are better distributed thereby.

In order to provide for the vertical adjustment of the hopper 2 with respect to the disk 5, for the purpose hereinafter described, I have shown said hopper as carried by two collars 18 and 19, through which the cylindrical portion of said hopper passes, the collar 18 being supported on the arm 4 and rigidly secured thereto and the collar 19 being supported by the collar 18 and supporting in turn the hopper 2. The collars 18 and 19 are provided with interlocking teeth 20, each having a long inclined face, so that by turning the upper collar with respect to the lower collar the inclined faces of the teeth of the upper collar 19 will be caused to slide on the corresponding faces of the teeth of the lower collar, thus raising or lowering the upper collar and the hopper 2 in an obvious manner.

21 represents a strap which is secured at one end to the collar 18 and provided near its other end with a slot 22, through which passes a threaded bolt secured to the collar 19, said bolt being provided with a clamping-nut 23, by means of which the two collars may be locked in any desired position of relative adjustment in an obvious manner.

As thus constructed the operation is as follows: The material to be handled is poured into the hopper 2 and passes from the open lower end thereof onto the disk 5, where it spreads laterally in all directions to a distance which will depend largely upon the distance between the disk and the lower end of the hopper and also upon the nature of the material and the readiness with which it flows. Ultimately the material will come to rest in the form of a substantially frusto-conical mound which will reach from the disk to the lower end of the hopper and close the latter, thus stopping the flow of material therefrom. The distance of the lower end of the hopper from the disk is so adjusted that when the disk is stationary the material will not flow over it quite far enough to reach its edge. It is assumed that means are provided for causing the shaft 10 to rotate rapidly or to stop, as desired, and if said shaft be now started and the disk 5 thus caused to oscillate the agitation of the material thus produced will tend to flatten the pile of material resting upon the disk and will cause said material to flow over the entire periphery of the disk in a stream of practically constant and uniform dimensions at all points, the volume of which stream may be regulated either by adjusting the hopper 2 vertically or by varying the speed of rotation of the shaft 10. Upon stopping said shaft the flow of material over the disk 5 will instantly cease, and with the starting of said shaft again the flow of material will recommence and will continue so long as said shaft continues to rotate and sufficient material is supplied to the hopper. Thus not only is the starting and stopping of the flow of material readily accomplished, but the rate of flow is also capable of accurate regulation, and both of these results are secured without the use of any flow-controlling valves whatever.

I have found that my apparatus will operate as above described upon a great variety of materials with entire success without requiring any change or adjustment other than in the position of the hopper 2.

The material which falls over the edge of the disk is received by a hopper 24, which delivers into the weighing-machine or other apparatus which is to operate upon the material being fed, and the pins 8 and arms 15 are preferably made as thin as possible and brought to a sharp edge on their top edges adjacent to the disk in order to prevent material from lodging upon them.

In order to prevent an inert mass of material from accumulating at and near the center of the disk 5, where it would not be fed outward by the oscillation thereof, I prefer to provide on the upper face of said disk an upwardly-extending projection having substantially a conical form, as shown at 25, whereby the material is kept away from the center of the disk and all the material delivered by the hopper is kept moving toward the edge of the disk until it falls over the same. This projection may be formed by stamping the disk into the proper shape, as shown in Fig. 3.

I am aware that feeding devices have heretofore been employed in which a stream of material is caused to flow over the edge of a disk by being scraped therefrom by a relatively moving blade or the like and also that it is old to employ vibratory shaking devices of various sorts for facilitating the flow of material; but so far as I am aware it is new with me to cause material to flow over the edge of a horizontal plate by merely oscillating the said plate around a central vertical axis without the employment of scrapers or similar devices of any sort. Such scraping devices are disadvantageous in handling many kinds of material—such as tea, for example, the leaves of which are crushed and broken to a considerable extent by the grinding action of such a scraper—while those devices which have vibratory shakers are objectionable because their operation is due to a certain extent to the inertia of the material passing through or over them, so that they are usually incapable of delivering material in a continuous stream at an unvarying rate or of handling more than one kind of material. It will be noted that in the operation of my apparatus the agitation of the material takes place in lines which are transverse to the lines of flow, so that the momentum of the flowing material is not directly varied thereby.

It will be evident that my improvements are not limited to the specific construction and arrangement herein shown and described, as these details may be variously modified, particularly in respect to the manner in which the oscillating member is supported and actuated, without departing from my invention.

I claim as my invention—

1. In an apparatus for feeding material, the combination of a chute or hopper having an opening in its lower end, a horizontal plate supported to oscillate beneath said opening at a distance therefrom and extending laterally beyond the same, and means for oscillating said plate about a vertical axis.

2. In an apparatus for feeding material, the combination with a chute or hopper having an opening in its lower end, of a horizontal plate supported to oscillate beneath said opening at a distance therefrom and extending laterally beyond the same, means for varying said distance, and means for oscillating said plate.

3. In an apparatus for feeding material, the combination with a chute or hopper having an opening in its lower end, of a horizontal plate supported to oscillate beneath said opening at a distance therefrom and extending laterally beyond the same, means for oscillating said plate about a central vertical axis, and a material-deflecting projection tapering upwardly from said plate beneath said chute.

4. In an apparatus for feeding material, the combination of a vertically-adjustable hopper having an opening at its lower end, a horizontal plate supported to oscillate beneath said opening at a distance therefrom and extending laterally beyond the same, said plate being provided beneath said opening with a concentric, upwardly-extending projection of substantially conical form, and means for oscillating said plate about a central vertical axis.

5. In an apparatus for feeding material, the combination of a chute or hopper having an opening in its lower end, a horizontal plate supported to oscillate beneath said opening at a distance therefrom and extending laterally beyond the same, means for oscillating said plate about a vertical axis, and means for adjusting said chute or hopper vertically and for locking the same in adjusted position.

6. In an apparatus for feeding material, the combination with a chute or hopper having an opening in its lower end, of a horizontal plate of greater area than said opening and means for supporting the same beneath said opening at a distance therefrom, said means comprising radially-arranged flexible strips fixed at their upper ends and connected to said plate at their lower ends, and means for oscillating said plate.

7. In an apparatus for feeding material, the combination of a chute or hopper having an opening at its lower end, a horizontal plate of greater area than said opening, means for supporting said plate beneath said opening at a distance therefrom, comprising four flexible strips fixed at their upper ends and connected to said plate at their lower ends, said strips being disposed at equal distances from one another around the periphery of said plate and located in radial planes with respect to the center thereof, and means for oscillating said plate.

8. In an apparatus for feeding material, the combination of a chute or hopper having an opening at its lower end, a horizontal plate of greater area than said opening, means for supporting said plate beneath said opening at a distance therefrom, comprising four flexible strips fixed at their upper ends and connected to said plate at their lower ends, said strips being disposed at equal distances from one another around the periphery of said plate and located in radial planes with respect to the center thereof, and means for oscillating said plate comprising a rotatable shaft, diametrically opposite crank-arms carried thereby, and connections between said crank-arms and plate at the opposite extremities of a diameter of the latter.

9. In an apparatus for feeding material, the combination of a frame carrying a horizontal collar provided at its upper edge with a series of teeth having inclined faces, a second collar having similar teeth on its lower edge and supported for relative rotation on the teeth of the first collar, a hopper carried by said second collar and having an opening at its lower end, means for securing said collars in adjusted relation, a horizontal plate supported to oscillate beneath said opening at a distance therefrom and extending laterally beyond the same, and means for oscillating said plate about a vertical axis.

10. In an apparatus for feeding material, the combination of a frame provided with a collar 18 and with radiating arms 7, a hopper passing through said collar and adjustably supported thereby, said hopper having an opening in its lower end, flexible strips fixed respectively at their upper ends to said radiating arms and arranged in radial planes, a horizontal plate carried by the lower ends of said strips and located beneath the opening in the lower end of said hopper at a distance therefrom, and extending laterally beyond the same, and means for oscillating said plate.

11. In an apparatus for feeding material, the combination of a frame provided with a collar 18 and with radiating arms 7, a hopper passing through said collar and adjustably supported thereby, said hopper having an opening in its lower end, flexible strips fixed respectively at their upper ends to said radiating arms and arranged in radial planes, a horizontal plate carried by the lower ends of said strips and located beneath the opening in the lower end of said hopper at a distance therefrom, and extending laterally beyond the same, and means for oscillating said plate comprising a rotatable shaft, diametrically opposite crank-arms carried thereby, and connections between said crank-arms and plate at the opposite extremities of a diameter of the latter.

In testimony whereof I have hereunto subscribed my name this 30th day of November, 1903.

WILLIAM E. NICKERSON.

Witnesses:
E. D. CHADWICK,
JOSEPH T. BRENNAN.